Dec. 19, 1922.
G. R. MAUPIN.
BOILER TOOL.
FILED NOV. 15, 1920.
1,439,569.
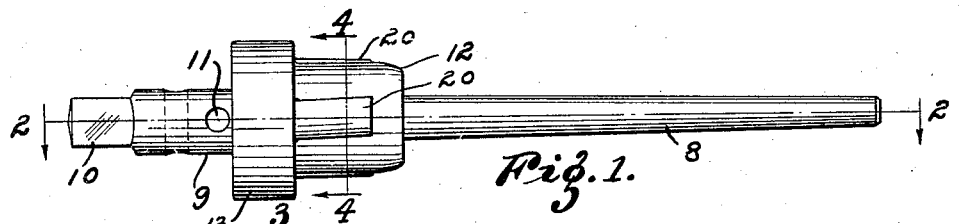
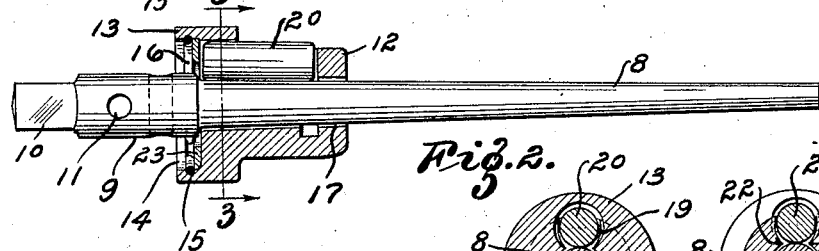
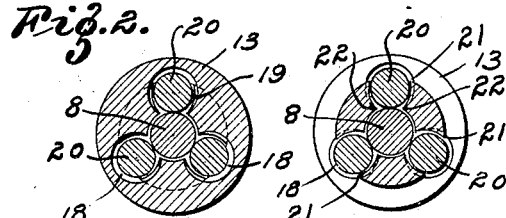
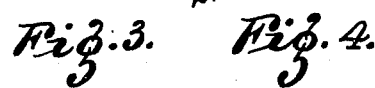
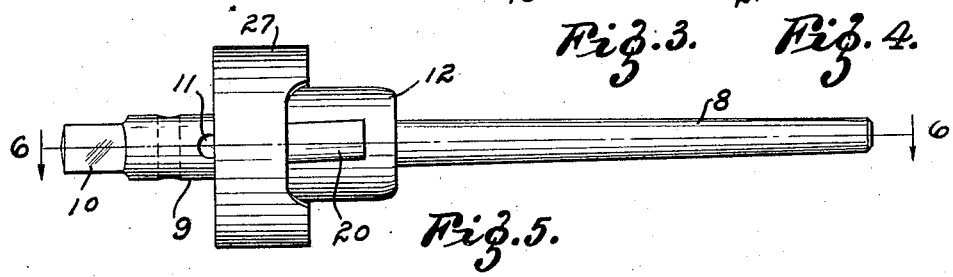
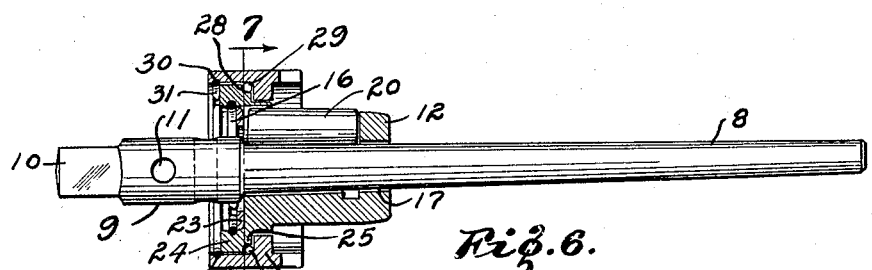
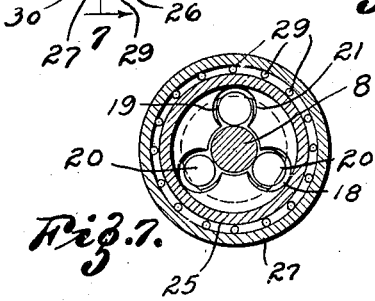
Inventor:
Graves R. Maupin
By Edward E. Longan
Atty.

Patented Dec. 19, 1922.

1,439,569

UNITED STATES PATENT OFFICE.

GRAVES R. MAUPIN, OF MOBERLY, MISSOURI, ASSIGNOR, BY MESNE ASSIGNMENTS, TO THE J. FAESSLER MANUFACTURING COMPANY, OF MOBERLY, MISSOURI, A CO-PARTNERSHIP COMPOSED OF JOHN W. FAESSLER, CHRISTINIA FAESSLER, LOUIS E. FAESSLER, AND GRAVES R. MAUPIN.

BOILER TOOL.

Application filed November 15, 1920. Serial No. 424,125.

*To all whom it may concern:*

Be it known that I, GRAVES R. MAUPIN, citizen of the United States, and resident of the city of Moberly, county of Randolph, and State of Missouri, have invented certain new and useful Improvements in Boiler Tools, of which the following is a specification containing a full, clear, and exact description, reference being had to the accompanying drawings, forming a part hereof.

This invention relates to improvements in boiler tools and has for its primary object a boiler tool for preparing openings in the boiler head for receiving tubes and also to secure the tubes within said openings.

A further object is to construct a boiler tool wherein the cage is so constructed that the use of a roll retainer is not necessary.

A still further object is to construct the cage of a boiler tool out of a solid piece of material, the openings for the mandrel and rollers being drilled and the roller recesses or openings then broached so that they will be elongated and allow the rollers to move radially therein.

In the drawings:

Fig. 1 is a side elevation of a boiler tool as used for rolling in boiler tubes.

Fig. 2 a longitudinal section taken on the line 2—2 of Fig. 1.

Fig. 3 a cross section taken on the line 3—3 of Fig. 2.

Fig. 4 a cross section taken on the line 4—4 of Fig. 1.

Fig. 5 a view of the boiler tool when used for preparing the openings in a boiler sheet to receive the tubes.

Fig. 6 a longitudinal section taken on the line 6—6 of Fig. 5.

Fig. 7 a cross section taken on the line 7—7 of Fig. 6.

In the construction of my device I employ a mandrel having a tapered portion 8, a cylindrical portion 9, and a square portion 10. The cylindrical portion 9 is interposed between the square portion 10 and the tapered portion 8 and is provided with openings 11 for the purpose of inserting a bar so that the mandrel can be turned while the squared portion 10 is intended for a wrench, when it is desired to use that means for turning the mandrel. On the mandrel is mounted a cage 12, which cage is provided with an enlarged portion 13. The enlarged portion 13 is provided with a recess or counterbore 14 and in the walls of this counterbore is formed a semi-circular recess 15 in which a split ring 16 is adapted to be sprung. The cage 12 is provided with a central bore 17, which extends entirely therethrough and opening into this bore are a plurality of bores 18, these bores being arranged radially and preferably three in number. The bores 18 extend only a trifle farther than the enlargement 13. The remainder of the cage is provided with openings 19. These openings are not true circles, but are made by first drilling a cylindrical hole and then broaching the same so that the hole will be longer on a line taken through the center of the cage. This broaching is for the purpose of allowing rollers 20 to move radially, or, in other words, be forced outward from the cage as the mandrel has its tapered portion 8 forced through the cage. The openings 19 are arranged at an angle to the axis of the cage so that by turning the mandrel the same will be fed either into or out of the cage. As illustrated in Fig. 4, the edges 21 and 22 of the openings 19 are spaced so that the rollers 20 can not pass between; in other words, the distance between the points 21 and the points 22 is less than the diameter of the roller,— this prevents the roller 20 from falling either out of the cage or from falling within it when the mandrel is withdrawn. Within the counterbore 14 is placed a washer 23. This washer is for the purpose of preventing the rollers 20 from sliding out of the openings when the mandrel is withdrawn.

As illustrated in Figs. 5, 6 and 7 the cage 12 is provided with an enlargement 24. This enlargement is provided with a reduced portion 25, against which the flange 26 of a thrust collar 27 contacts. When it is desired to make this collar 27 ball bearing one edge of the enlargement 24 is recessed, as at 28, which receives the bearing balls 29. The thrust collar 27 is provided with a semi-circular recess 30, in which is seated a split spring ring 31, the purpose of this is to retain the thrust collar upon the enlargement 24. The remainder of the structure; that is, of the cage and mandrel, is identically the same as that shown in Figs. 1, 2, 3 and 4. While the device as shown in Figs. 5, 6 and 7 is intended primarily to form a seat in boiler sheets for the reception of tubes, the same can also be used to secure the tubes within the sheet after the seat has been formed and in this case it will be necessary to remove the thrust collar,—this collar being for the purpose of standardizing the holes in the sheet so that one hole will not be made larger than the other, and the purpose for loosely mounting it on the enlargement 24 is to prevent the scoring of the boiler sheet.

It will be seen from the foregoing description that I have constructed a boiler tool having fewer parts than the devices as at present used and one which can be taken apart for replacements very readily, it only being necessary to remove the spring 16 and washer 23 in order to remove the rollers 20, while in devices as at present used a roll retainer is necessary which will also have to be removed before it is possible to remove the rollers for replacement.

Having fully described my invention, what I claim is:

1. A boiler tool comprising a tapered mandrel, a cage formed of a solid piece of material, said cage provided on one of its ends with a counterbored enlargement, a cylindrical opening extending centrally through said cage, said opening adapted to receive the mandrel, a plurality of openings disposed radially to the central opening and diagonally thereto, said openings being oval in cross section and opening into the central opening and on the outside cylindrical surface of the cage, a plurality of rollers located in said openings, a thrust collar secured to said cage, and a split spring ring for securing said collar to said cage.

2. A boiler tool comprising a cage, a mandrel extending through said cage, a plurality of rollers, openings formed in said cage, said openings so formed as to permit radial movement of the rollers when placed therein, the longitudinal edges of said openings being so spaced as to prevent the rollers from passing radially therethrough, means carried by the cage for holding the rollers against longitudinal movement, a thrust collar revolubly secured to said cage, and a split spring ring for holding said collar on said cage.

In testimony whereof, I have signed my name to this specification.

GRAVES R. MAUPIN.